(12) United States Patent
Peuser et al.

(10) Patent No.: US 8,457,171 B2
(45) Date of Patent: Jun. 4, 2013

(54) MINIATURIZED LASER AMPLIFIER ARRANGEMENT HAVING A PUMP SOURCE

(75) Inventors: Peter Peuser, Bad Camberg (DE); Willi Platz, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 13/512,027

(22) PCT Filed: Nov. 26, 2009

(86) PCT No.: PCT/DE2009/001676
§ 371 (c)(1),
(2), (4) Date: Aug. 29, 2012

(87) PCT Pub. No.: WO2011/063777
PCT Pub. Date: Jun. 3, 2011

(65) Prior Publication Data
US 2012/0314724 A1 Dec. 13, 2012

(51) Int. Cl.
*H01S 3/00* (2006.01)
*H01S 3/06* (2006.01)
*H01S 3/092* (2006.01)
*H01S 3/08* (2006.01)
*H01S 3/082* (2006.01)

(52) U.S. Cl.
USPC .............. 372/70; 372/38.06; 372/66; 372/92; 372/97

(58) Field of Classification Search
USPC ................ 372/69, 92, 97, 70, 38.06; 359/333
See application file for complete search history.

(56) References Cited

U.S. PATENT DOCUMENTS

| | | |
|---|---|---|
| 6,373,864 B1 | 4/2002 | Georges et al. |
| 6,512,630 B1 | 1/2003 | Zayhowski |
| 6,553,052 B1 | 4/2003 | Ireland |
| 2010/0218739 A1 | 9/2010 | Herden et al. |

FOREIGN PATENT DOCUMENTS

| | | |
|---|---|---|
| DE | 10 2006 030 722 A1 | 1/2008 |
| DE | 10 2006 059 223 A1 | 6/2008 |
| WO | WO 90/15462 A1 | 12/1990 |
| WO | WO 2007/056999 A2 | 5/2007 |

OTHER PUBLICATIONS

International Search Report with English translation dated May 27, 2011 (seven (7) sheets).
Peuser et al., "Diodengepumpte Festkoerperlaser", Springer-Verlag, 1995 (three (3) sheets).

(Continued)

*Primary Examiner* — Armando Rodriguez
(74) *Attorney, Agent, or Firm* — Crowell & Moring LLP (57) ABSTRACT

A laser amplifier arrangement includes an optical pump source and an axially arranged laser oscillator-amplifier configuration pumped by the pump radiation. The laser oscillator-amplifier configuration includes a laser oscillator excitable by a portion of the pump radiation to emit a laser beam, and a laser amplifier that amplifies the laser beam using the pump radiation. The laser oscillator and laser amplifier are arranged in a substantially coaxial or collinear manner relative to a longitudinal axis of the laser oscillator-amplifier configuration. The pump source includes a first beam source for producing a first pump radiation to pump the laser oscillator, a second beam source for producing a second pump radiation for the laser amplifier, and a pump radiation conducting device, by means of which both the first and the second pump radiation can be lead into the laser oscillator-amplifier configuration substantially in the direction of the longitudinal axis for longitudinal pumping.

27 Claims, 7 Drawing Sheets

OTHER PUBLICATIONS

Peuser et al., "High-Power, Longitudinally Fiber-Pumped, Passively Q-Switched Nd: YAG Oscillator-Amplifier", Optics Letters, Jul. 1, 2006, vol. 31, No. 13, pp. 1991-1993 (three (3) sheets).

Di Teodoro et al., "Diffraction-Limited, 300-kW Peak-Power Pulses from a Coiled Multimode Fiber Amplifier", Optics Letters, Apr. 1, 2002, vol. 27, No. 7, pp. 518-520 (three (3) sheets).

Farrow et al., "Peak-Power Limits on Fiber Amplifiers Imposed by Self-Focusing", Optics Letters, Dec. 1, 2006, vol. 31, No. 23, pp. 3423-3425 (three (3) sheets).

Saikawa et al., "High-energy, narrow-bandwidth 2-μm optical parametric oscillator/power amplifier based on periodically poled MgO:LiNbO3", Lasers and Electro-Optics and 2006 Quantum Electronics and Laser Science Conference, CLEO/QELS 2006, Conference on, IEEE, Piscataway, NJ, USA, May 21, 2006, pp. 1 and 2, XP031394201 (two (2) sheets).

MINIATURIZED LASER AMPLIFIER ARRANGEMENT HAVING A PUMP SOURCE

BACKGROUND AND SUMMARY OF THE INVENTION

The invention relates to a laser amplifier arrangement, in particular a miniaturized laser amplifier arrangement.

The invention relates in particular to a compact fiber-coupled solid-state laser oscillator/laser amplifier for generating laser radiation with a high beam quality and a high power.

For many applications, it is desirable or even necessary to have miniaturized lasers that can generate pulsed laser radiation with pulse widths of a few nanoseconds and pulse energies in the range of several mJ. Examples of applications are long-range laser measurement systems, lasers for precision material processing or for exciting optically nonlinear processes. Diode-pumped solid-state lasers are particularly suitable for this. For further details in this regard, reference is made to P. Peuser, N. P. Schmitt: "Diodengepumpte Festkörperlaser" [Diode-pumped solid-state lasers], Springer Verlag, 1995. The necessary pulse powers typically lie in the range of from about 100 kW to more than one MW.

It is possible to produce particularly compact or even miniaturized pulse lasers using passive Q-switching but at present reliable operation with a high beam quality and amplitude stability is possible only with maximum pulse energies of a few mJ. Corresponding pulse lasers are described in P. Peuser, W. Platz, P. Zeller, T. Brand, B. Köhler, M. Haag; Opt. Lett. 31 (2006) 1991. In order to achieve power scaling, one or more amplifiers with a multiple beam path (multipass) may be connected downstream, so that particularly large pulse energies are achieved. In this case, however, the possibilities of substantial miniaturization are reduced.

When the so-called longitudinal pump geometry can be applied for exciting the active material, optimal conditions can be provided for achieving high efficiency and good compactness. Further details in this regard may be found in the aforementioned literature reference P. Peuser, N. P. Schmitt: Diodengepumpte Festkörperlaser, Springer Verlag 1995.

For practically suitable laser systems, it is particularly advantageous when the coupling to the supply and control electronics can be established over a several meter long fiber connection.

Recently developed pulsed fiber lasers or fiber amplifier arrangements are distinguished by a very compact structure and a high beam quality, but the available pulse powers usually lie below 100 kW, which is no longer sufficient for many applications.

In this case, various fundamental physical processes limit the pulse energies to the range of typically about 1 mJ. These processes are primarily ASE (so-called amplified spontaneous emission), stimulated Brillouin scattering, stimulated Raman scattering and self-focusing. In this context, reference is made to F. D. Teodoro et al., Opt. Lett. 27 (2002) 518 and R. L. Farrow et al., Opt. Lett. 31 (2006) 3423 for further details. Owing to the small fiber cross section, extremely high intensities occur in ns pulsed operation, so that when the pump power is scaled the fiber is destroyed. In order to generate a few mJ, the fiber cross section must be increased to such an extent that the beam quality would be significantly reduced.

U.S. Pat. No. 6,553,052 B1 discloses a laser amplifier arrangement comprising a laser oscillator and a laser amplifier, wherein the laser oscillator and the laser amplifier are pumped by a common laser diode. The amplified laser beam is coupled laterally out of the laser amplifier arrangement. The pump beam of the laser diode first enters the laser amplifier, in order to pump it. Remaining pump radiation, which passes through the laser amplifier (transmission) is used for pumping the laser oscillator in order to generate the laser radiation to be amplified. To this end, the laser amplifier is arranged between the laser oscillator and the pump source. The remaining part of the pump radiation, passing through the laser amplifier, is introduced into the laser oscillator at a front end, through which the laser radiation to be amplified also emerges from the laser oscillator, before then being introduced into the laser amplifier. The amplified laser radiation, emerging from the end of the laser amplifier directed toward the pump source, must then be coupled out laterally since the pump source stands in the way in the direction of the longitudinal axis. In order to couple the residual pump radiation into the laser oscillator, beam optics with stops are provided, which comprise lenses having central opening for unimpeded passage of the laser oscillator radiation travelling back.

Although this configuration makes it possible for a large part of the pump radiation to be available for the laser amplification, it places significant limits on miniaturization.

U.S. Pat. No. 6,373,864 B1 discloses a laser amplifier arrangement suitable as a fully passive laser system for generating and amplifying short pulses with a high repetition rate. To this end, a microchip laser is provided as a laser oscillator, which is optimized for generating short laser pulses with a high repetition rate. To this end, its resonator length is selected to be very short in order to be able to generate short pulses. Furthermore, a first pump source for the laser oscillator is optimized with a view to a high repetition rate. To this end, the first pump source is provided with a particularly bright pump light source. The pump radiation generated by the first pump source is coupled by first pump beam optics, or in an alternative embodiment by a first light guide fiber, into the laser oscillator at a first longitudinal end. The laser radiation to be amplified then emerges at the opposite longitudinal end of the laser oscillator, and is introduced by focusing optics into a laser amplifier crystal, arranged offset with respect to the longitudinal axis of the laser oscillator, at its first longitudinal end. At the opposite second longitudinal end, the laser amplifier crystal is provided with a reflector for the laser radiation to be amplified, so that the amplified laser beam is in turn directed back through the first longitudinal end, emerges again offset with respect to the incoming laser radiation and is output by the focusing optics. The laser amplifier crystal is pumped by a second pump source, which is optimized with respect to the light polarization and the radiation for amplification, in order to achieve a particularly high gain. This second pump source comprises a second pump beam source and its own second pump beam optics, by which the second pump radiation thereby generated is introduced, in the opposite direction and offset in terms of the longitudinal axes with respect to the first pump radiation, into the laser oscillator/amplifier configuration formed by the laser oscillator and the laser amplification crystal. Specifically, the introduction takes place at the second longitudinal end of the laser amplification crystal, which is provided with the reflective coating for reflecting the laser radiation to be amplified.

This reflective coating is intended to be used to guide the laser beam through the laser amplification crystal two times, so as to increase the gain. Like the first pump beam guide device, the second pump beam guide device may comprise a light guide fiber. Yet even in the case of a light guide fiber, this second pump radiation is introduced through the second longitudinal end of the laser amplifier crystal, while the first pump radiation is introduced into the laser amplifier configuration at the opposite first longitudinal end of the laser oscillator, and furthermore with an offset.

Although the laser amplifier arrangement according to this prior art is optimized with a view to amplifying pulses which are as short as possible with a repetition rate which is as high as possible, it is entirely unsuitable for miniaturization.

U.S. Pat. No. 6,512,630 B1 describes a miniaturized configuration in which a so-called passively Q-switched microlaser, or in general miniaturized laser, is coupled to an amplifier. All of the pump radiation is coupled into the microlaser and thereby partially absorbed in the laser crystal. The transmitted residual pump radiation, not absorbed in the laser oscillator, is focused together with the laser beam generated by the microlaser into the amplifier crystal by means of a lens. The laser beam emerging from the oscillator is then amplified in the amplifier crystal. In this prior art, all of the pump radiation is provided by a single diode laser beam source.

However, such a configuration is not suitable for efficient scaling of the power, or pulse energy, as will be explained below. In this context, distinction may fundamentally be made between two different pump types: quasi continuous-wave or pumped excitation and continuous-wave excitation.

In the case of quasi continuous-wave excitation, a single pulse that contains the maximum possible energy may be generated, or several pulses of smaller energy may be generated during a pump cycle.

In the case of pulsed excitation, the following applies: when there is an increase in the pump power, the laser pulse is generated earlier by the oscillator, in relation to the start of a pump radiation pulse of constant length. Owing to this, the energy stored in the amplifier can subsequently no longer be used, and the overall gain can no longer be increased. Directly connected with this, there is also a reduction in the overall efficiency. Temporal adaptation of the oscillator pulse to the pump radiation duration is crucial for achieving maximum pump energy and a high efficiency.

When there is an increase in the pump power on the other hand, in general several pulses, which respectively contain a smaller amount of pulse energy, are generated during a pump cycle. The temporal spacing of the pulses is commensurately less when the pump power is higher. Accordingly, an increase in the total pump power, for achieving a higher gain, simultaneously leads to a change in the pulse rate.

Similar considerations apply for the case of continuous-wave excitation. When the overall pump power of the laser oscillator/amplifier arrangement is increased, the pulse rate is in this case increased together with a simultaneous reduction in the individual pulse energy of the pulses generated by the laser oscillator. Or, expressed another way, a change in the pump power or the gain causes a change in the pulse rate. Furthermore, the pulse width changes as well since the inversion density in the laser oscillator crystal also changes.

Exemplary embodiments of the present invention are directed to a high-power laser with controllable power and having high beam quality and a high efficiency, which can be miniaturized to a very great extent.

The laser amplifier arrangement according to the invention comprises an optical pump source and a laser oscillator/amplifier configuration, which can be pumped by pump radiation from the pump source. The laser oscillator/amplifier configuration is arranged axially. Owing to the axial arrangement along the laser axis, the dimensions of the configuration can be kept very small. The laser oscillator/amplifier configuration comprises a laser oscillator and a laser amplifier. The laser oscillator can be excited by pump radiation to emit a laser beam, which is guided to the laser amplifier and amplified there. To this end, the laser amplifier is likewise excited by pump radiation. In order to achieve a high degree of miniaturization, the laser oscillator and the laser amplifier are essentially arranged coaxially or collinearly with respect to a longitudinal axis of the laser oscillator/amplifier configuration.

The pump source comprises at least two beam sources. A first beam source generates first pump radiation for pumping the laser oscillator. At least one second beam source generates second pump radiation for the laser amplifier. Both pump radiations are introduced into the laser oscillator/amplifier configuration so that it is excited in the longitudinal direction.

To this end, a pump radiation guide device is provided, by means of which the two pump radiations can be introduced into the laser oscillator/amplifier configuration for longitudinal pumping essentially in the direction of the longitudinal axis.

Preferably, laser radiation from at least two or more fiber-coupled diode laser beam sources, which are operated independently of one another, is used in order to excite a compact, axially arranged laser oscillator/amplifier configuration (preferably a solid-state laser oscillator/amplifier configuration) in the longitudinal direction. It is in this case preferable to optically pump the laser oscillator and the amplifier independently of one another.

According to preferred configurations, the laser may be passively or actively Q-switched.

The effect achieved by this configuration is that a high-power laser with controllable power and having high beam quality and a high efficiency is achieved with a very high degree of miniaturization.

Advantageous uses of the laser amplifier arrangement and advantageous configurations thereof are:
 a) robot-mounted laser systems,
 b) miniaturized aircraft-mounted LIDAR systems,
 c) laser transmitters for use in space or
 d) pump lasers for optically nonlinear processes.

An extremely compact and optimally controllable laser configuration is preferably produced, with which high-power ns pulses can be generated. The configuration presented here furthermore makes it possible to use active Q-switching.

The pump configuration according to the invention is advantageously used in conjunction with optical deviation systems—for example with lenses and precision mechanical elements—which guide the second pump radiation past the laser oscillator to the laser amplifier. In this way, the laser oscillator and the amplifier can be optimized independently of one another and tuned to one another, so that laser radiation with a high beam quality, high-power laser pulses and a high efficiency can be generated.

Out of the overall pump radiation power of the pump source, the second pump radiation to be used for exciting the laser amplifier preferably has by far the largest part. This may, for example, be achieved by configuring the second radiation source as a high-power diode laser, while the first beam source may be a diode laser of lower power. In another advantageous configuration, the pump source for forming the second radiation source comprises a multiplicity of diode lasers, which together generate the second pump radiation.

The first and second pump radiations are preferably guided through an optical fiber line to the laser oscillator/amplifier configuration. For the purpose of greatest possible miniaturization, various configurations of this optical fiber line may be envisaged. A parallel arrangement of a first optical fiber for guiding the first pump radiation and a second optical fiber for guiding the second pump radiation may be selected, in such a way that the fibers lie closely next to one another. A configuration in which the first optical fiber is arranged centrally inside a second fiber arrangement is particularly preferred. In this way, the second pump radiation is introduced annularly around the first pump radiation. The first optical fiber may thus readily extend as far as the laser oscillator, in which case the second pump radiation shone in radially outside the first optical fiber may be guided, for example by means of an optical deviation device, radially outside around and past the laser oscillator in the longitudinal direction as far as the laser amplifier.

Such an arrangement may, for example, be produced by the second optical fiber annularly surrounding the first optical fiber.

Particularly in the event that the second beam source comprises a group of second diode lasers, the optical fiber line may also comprise a fiber bundle consisting of second optical fibers, the first optical fiber being arranged in the middle of this fiber bundle (it does not need to be exactly in the middle, although this is preferred).

BRIEF DESCRIPTION OF THE DRAWING FIGURES

Exemplary embodiments of the invention will be explained in more detail below with the aid of the appended drawings, in which:

FIG. 2a shows a schematic representation of a pump radiation guide device which can be used in the pump source of FIG. 1a;

DETAILED DESCRIPTION

Figure 2A:
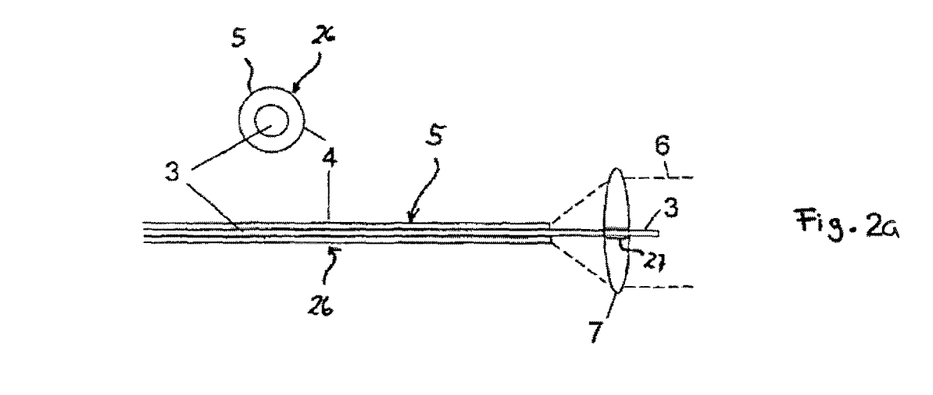
Figure 2B:
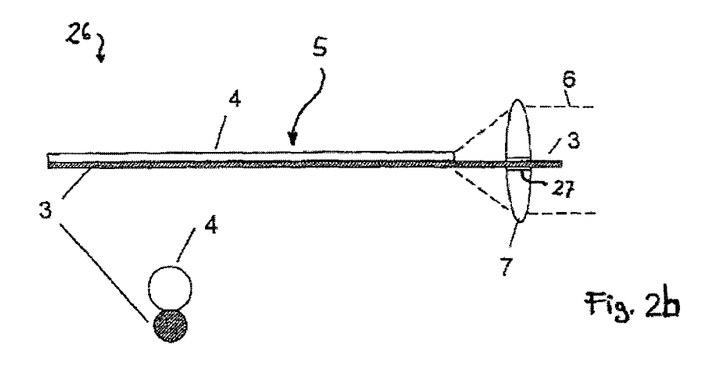
FIG. 2b shows a schematic representation of an alternative configuration of the pump radiation guide device.
Figure 3:
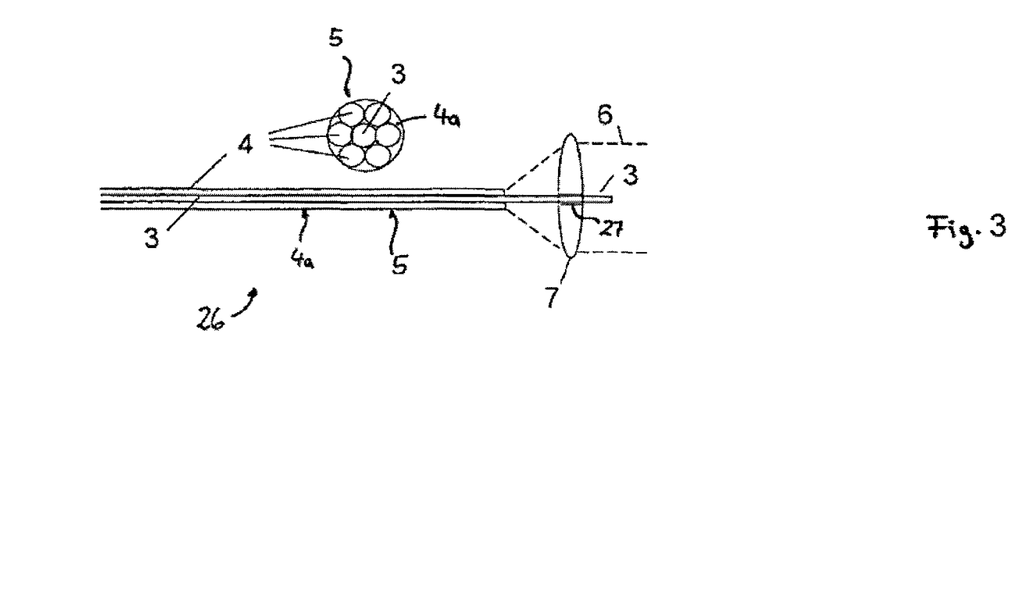
FIG. 3 shows a schematic representation of the pump radiation guide device which can be used in the second embodiment of the laser amplifier arrangement.

FIGS. 1a, 1b, 4 and 5 show different embodiments of a laser amplifier arrangement 19, which comprise a pump source 21 and a laser oscillator/amplifier configuration 24. FIGS. 2a, 2b and 3 show different configurations of pump radiation guide devices 26 for introducing the pump radiation generated by the pump source 21 into the laser oscillator/amplifier configuration 24.

In all the embodiments of the laser amplifier arrangement 19, the radiation from at least two or more beam sources is used for pumping the collinear laser oscillator/amplifier configuration 24. The longitudinal pump configuration is used in this case, which offers particular advantages with respect to efficiency and beam quality, as mentioned in detail in P. Peuser, N. P. Schmitt, Diodengepumpte Festkörperlaser, Springer Verlag 1995. Suitable laser-active materials are, for example, the well known Nd:YAG and Nd:YLF crystals or crystals comprising doping with Yb, Tm or Ho.

In the embodiments of the laser amplifier arrangement 19 which are represented, at least two or more high-power fiber-coupled diode lasers 1a, 2a, 2b are used as beam sources for the pump source 21.

Figure 1A:
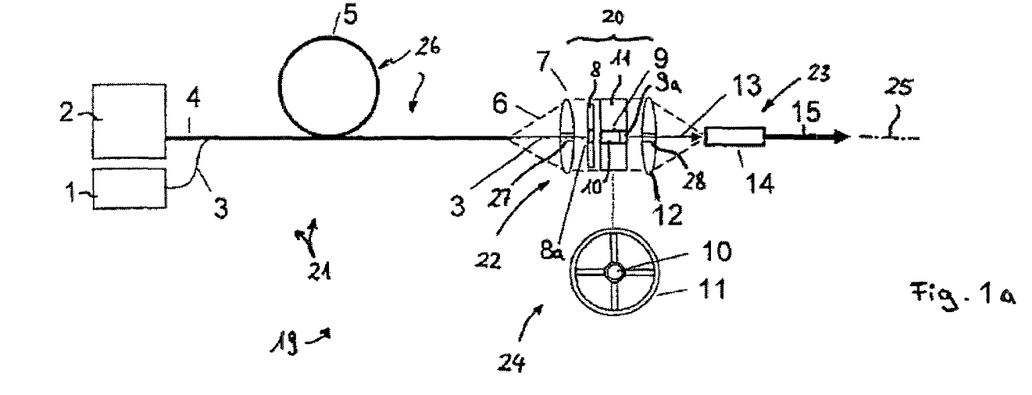
FIG. 1a shows a schematic representation of a first embodiment of a laser amplifier arrangement comprising a pump source and laser oscillator/amplifier configuration.

The first embodiment of the laser amplifier arrangement 19, as represented in FIG. 1a, shows a pump source 21 in which a first diode laser 1 is used as a first beam source for the first pump radiation and at least one second diode laser 2, here in the form of a high-power diode laser having a higher power than the first diode laser 1, is used as a second beam source for the second pump radiation 6.

The pump radiation guide device 26 comprises a plurality of optical fibers 3, 4 for guiding the first and second pump radiations to the laser oscillator/amplifier configuration 24. A first optical fiber 3 is used for pumping a miniaturized laser oscillator 9, while the majority of the pump power available overall is provided by one or more second fibers 4 in order to optically excite an amplifier crystal 14.

The laser oscillator/amplifier configuration 24 comprises the laser oscillator 9 and a laser amplifier 23. An optical deviation device 22 is furthermore provided, by means of which the second pump radiation 6 is collimated so that the second pump radiation 6 travels quasi-parallel over a particular defined path length 20 of from several millimeters to several centimeters—in this case parallel to the longitudinal axis 25 of the laser oscillator/amplifier configuration 24.

The laser oscillator 9 with a laser crystal 10 is located in an axial arrangement at the center of this second pump radiation 6 travelling along this path 20. The laser crystal 10 is held by a mount 11 comprising bars so that as much of the second pump radiation 6 as possible can pass through the mount 11, in order to be guided past the laser crystal 10 and then subsequently focused onto the amplifier crystal 14 of the laser amplifier 23. In this way, the second pump radiation 6 is used for optical excitation of the laser amplifier 23.

Figure 1B:
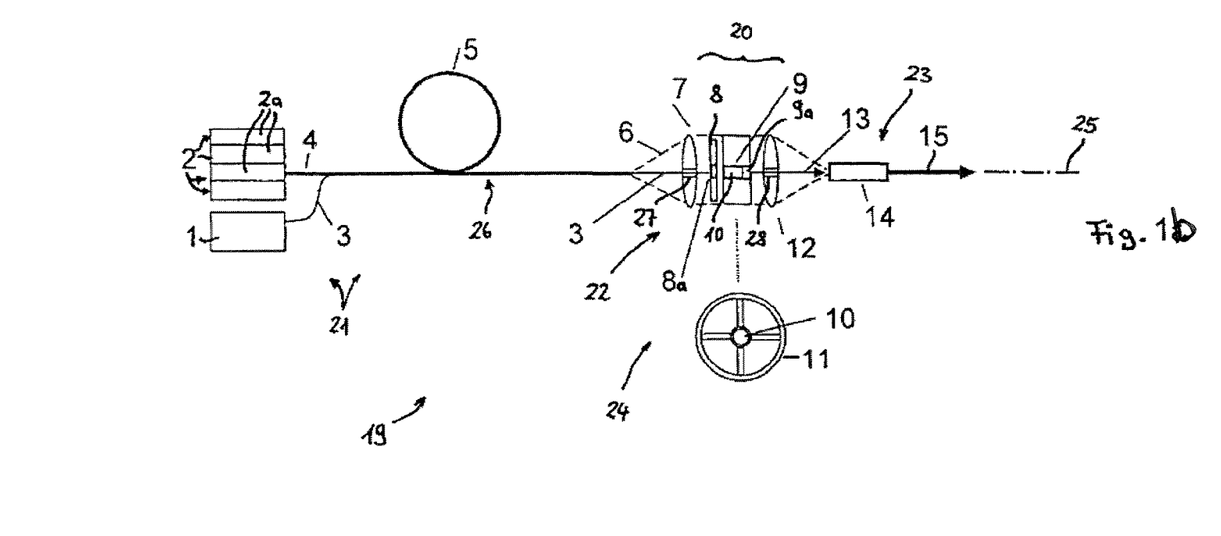
FIG. 1b shows a schematic representation of a second embodiment of the laser amplifier arrangement.

In the embodiments represented in FIGS. 1a and 1b, the laser crystal 10 is connected to a passive Q-switch (Q-switch crystal) 9a. The laser crystal 10 with the Q-switch 9a is located centrally in the mount 11.

The laser crystal 10 may be in optical contact with the passive Q-switch crystal 9a (so-called quasi-monolithic laser), the exit face of this crystal configuration being coated partially reflectively for the laser wavelength so that a laser beam 13 is emitted in the form of short laser pulses having a pulse width of typically a few nanoseconds. For further details of the fundamentals of the physical processes, reference is made to P. Peuser, N. P. Schmitt: Diodengepumpte Festkörperlaser, Springer Verlag 1995.

In the embodiments according to FIGS. 1a and 1b, a first (smaller) focusing lens 8a for the first pump radiation is provided on a mount 8 in front of the laser oscillator 9. In this way, the pump geometry of the laser oscillator 9 can be configured optimally. The smaller focusing lens 8a has a substantially smaller cross-section compared with the diameter of the pump radiation 6 along the path 20. The first focusing lens 8a is placed in front of the input coupling face of the laser crystal 10, so that the first pump radiation to be introduced into the laser oscillator 9 is focused into the laser crystal 10. The mount 8 for the first focusing lens 8a may be configured adjustably, so that the distance from the first focusing lens 8a to the laser crystal 10 is variable. In this way, the pump geometry for the laser oscillator 9 can be optimized and, in particular, the efficiency and the pulse energy can be determined.

The optical deviation device 22 comprises a collimator/lens device which—as represented—may be formed by a collimator lens 7 or by an entry face, acting as a collimator lens, of a lens unit (not represented). The collimator/lens device is used for collimating the second pump radiation 6. The optical deviation device 22 furthermore comprises a second focusing lens 12 for focusing the second pump radiation 6, guided past the laser oscillator 9, into the laser crystal 14 at the end of the path 20.

The collimator lens 7 is provided with a first aperture 27 so that the first pump radiation can be guided to the laser oscillator 9 without being influenced by the optical deviation device 22. The second focusing lens 12 is provided with a second aperture 28 in order to guide the laser beam 13, uninfluenced by the optical deviation device 22, to the laser crystal 14. In the laser crystal 14, excited by the second pump radiation 6, the laser beam 13 is amplified so that an amplified laser beam 15 emerges.

The first embodiment of the laser amplifier arrangement 19 according to FIG. 1a and the second embodiment of the laser amplifier arrangement 19 according to FIG. 1b differ essentially by the pump source 21. In the first embodiment, the pump source comprises the first diode laser 1 as a first beam source for generating the first pump radiation and the high-power diode laser as a second diode laser 2 for generating the second pump radiation. In the second embodiment, instead of the high-power diode laser, a group of diode laser beam sources 2b is provided, which is composed of a plurality of individual second diode lasers 2.

Different configurations of the pump radiation guide device 26 will be explained in more detail below with the aid of the representations in FIGS. 2a, 2b and 3.

In the embodiment of the pump radiation guide device 26 as represented in FIG. 2a, the first optical fiber 3 for guiding the first pump radiation for the laser oscillator lies at the center of another fiber, forming the second optical fiber 4, which guides the pump energy for the subsequent amplifier. The radiation provided by the central first fiber 3 is used to pump the miniaturized pulse laser oscillator 9 so that the laser beam 13 is generated, the energy of which is increased in the subsequent laser amplifier 23. The second pump radiation for the laser amplifier 23, guided in the second optical fiber 4 arranged by the annularly around the central first optical fiber 3, is collimated by means of the optical deviation device 22 so that it is guided around the laser oscillator 9 and finally focused into the axially arranged amplifier crystal 14.

In the further embodiment of the pump radiation guide device 26 as represented in FIG. 2b, the two pump fibers for the laser oscillator 9 and the laser amplifier 23—i.e. the first optical fiber 3 and the second optical fiber 4—are arranged closely next to one another. In this case, the second focusing lens 12 for the second pump radiation 6 (pump radiation of the amplifier crystal 14) is arranged slightly displaced transversely, so that the laser beam 13 and the pump beam lie above one another in the amplifier crystal 14. The pump radiation guide devices represented in FIGS. 2a and 2b are suitable in particular for the first embodiment of the laser amplifier arrangement 19 as represented in FIG. 1a.

In the alternative configuration of the pump radiation guide device 26 as represented in FIG. 3, which is suitable in particular for the second embodiment of the laser amplifier arrangement 19, the first optical fiber 3 which forms the pump fiber for the laser oscillator 9 is surrounded by a fiber bundle 4a consisting of a plurality of second optical fibers 4, which together convey the pump radiation for the laser amplifier 23. In this way, even higher pump powers can be provided for the laser amplifier 23, since the radiation of the plurality of diode laser beam sources 2b can be used for the optical excitation of the laser amplifier 23.

Figure 4:
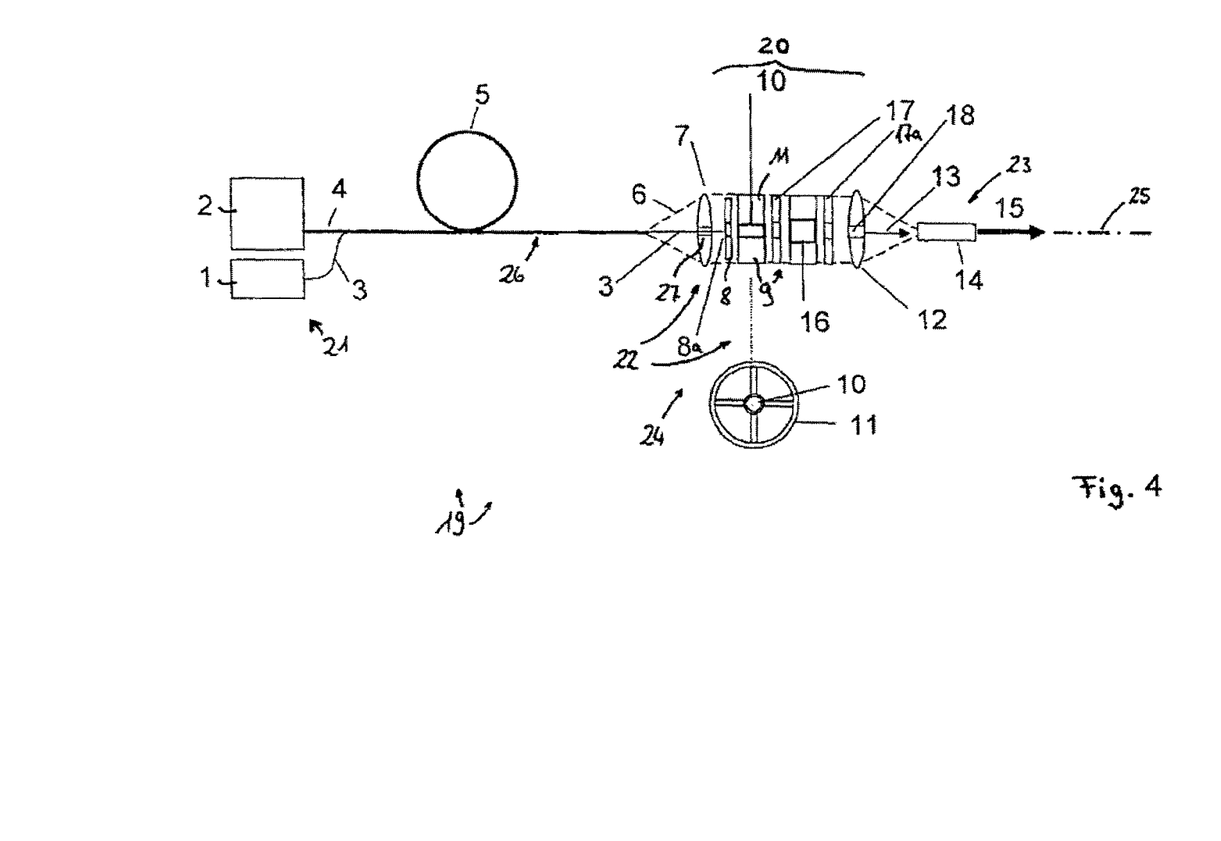
FIG. 4 shows a schematic representation of a third embodiment of the laser amplifier arrangement.

FIG. 4 represents a third embodiment of the laser amplifier arrangement 19, which constitutes a refinement of the first embodiment as shown in FIG. 1a or of the second embodiment as shown in FIG. 2a. The particularly compact arrangement of the laser oscillator/amplifier configuration 24 comprising the laser oscillator 9 and the axial laser amplifier 23 may also be used, according to this third embodiment, to produce an actively Q-switched laser amplifier arrangement 19. To this end, the passive Q-switch crystal 9a of the first or second embodiment is replaced by an electro-optical arrangement, known per se, consisting of a polarizer 17, an electro-optical Q-switch 16 and an analyzer 17a, which are installed in the resonator of the laser oscillator 9. A condition for this is that the electro-optical Q-switch 16 has a relatively small cross-section, so that the second pump radiation 6 can be guided past it. For example, to this end the Q-switch 16 is selected so that its diameter lies in the range of about one centimeter. Owing to the small diameter, it is possible to guide the collimated second pump radiation 6 past externally. Such miniaturized electro-optical Q-switches 16 are already known per se.

Figure 5:
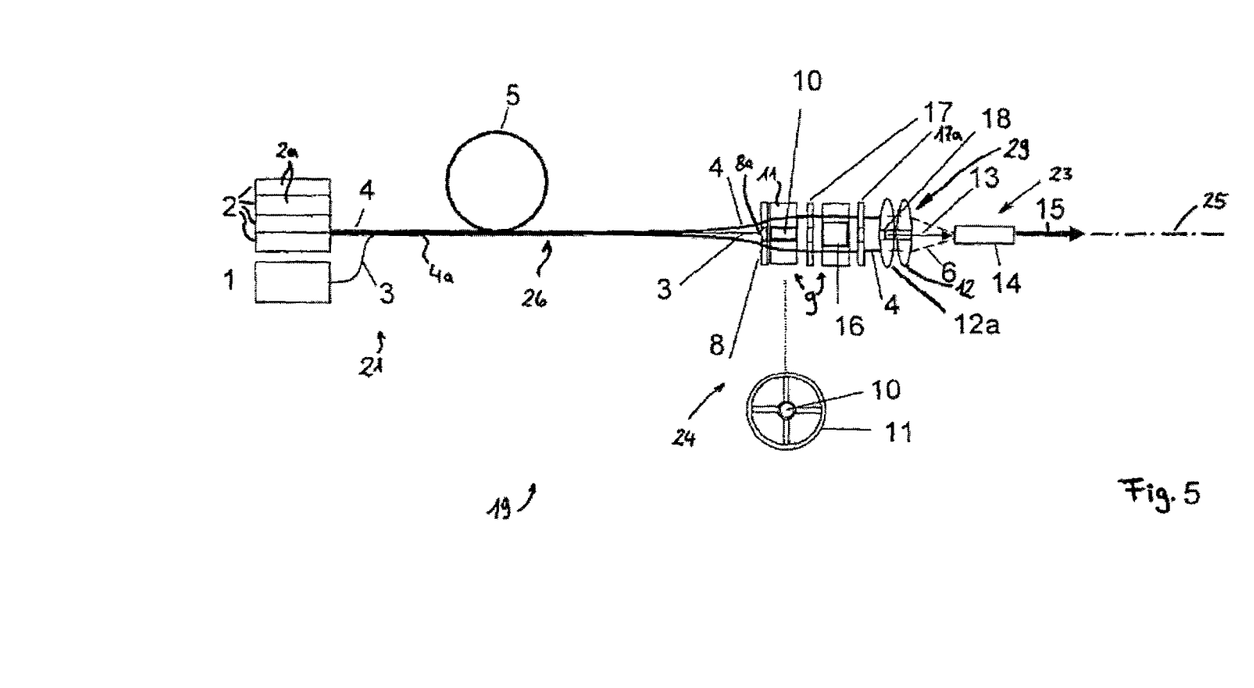
FIG. 5 shows a schematic representation of a fourth embodiment of the laser amplifier arrangement.

FIG. 5 represents yet another embodiment of the laser amplifier arrangement 19, which makes do without the optical deviation device 22. In this case the fiber bundle 4a, which conveys the pump radiation for the laser amplifier 23, is extended so that the second optical fibers 4 can be led around the laser oscillator 9. The emerging second pump radiation 6 can then be focused by collimator/focusing optics 29 into the laser amplifier 23. The collimator/focusing optics 29 comprise a collimator lens 12a and the second focusing lens 12. Through holes present at the center of the collimator/focusing optics 29, the laser beam 13 generated in the laser oscillator 9 enters the excited amplifier crystal 16, where it is amplified—amplified laser beam 15.

Like the exemplary embodiment of the laser amplifier arrangement 19 as represented in FIG. 4, the exemplary embodiment represented according to FIG. 5 uses the active Q-switch comprising the electro-optical Q-switch 16 as well as the polarizer 16 and analyzer 17a. The Q-switch 16 is held centrally here in a mount, which is configured in a similar way to the mount 11. In the exemplary embodiment represented in FIG. 5, an output coupling mirror 18 is placed in the region of the hole of the collimator lens 12a.

As well as for the generation of short laser pulses, the configurations of the laser amplifier arrangement 19 as described with the aid of FIGS. 1a to 5 may in principle also be used as an oscillator/amplifier arrangement for the generation of continuous-wave or quasi continuous-wave laser radiation, or single-frequency laser radiation, if the Q-switch crystal 9a is not used or the laser oscillator 9 is configured as a single-frequency laser. In this case the essential properties of the laser beam 13, 15, except for the power of the overall system, are determined by the laser oscillator 9. Here as well, it is advantageous that the power of the laser oscillator 9 can be controlled independently of the gain, so that the optimal beam properties can be achieved in the range of low output powers of the laser oscillator 9.

The effect achieved with the embodiments described above is that a high-power laser with high beam quality and a high efficiency can be achieved with a high degree of miniaturization.

Further particular advantages, especially in comparison with the miniaturized laser amplifier arrangement known from the prior art according to U.S. Pat. No. 6,512,630 B1, are:

the laser oscillator 9 and the laser amplifier 23 can be optimized independently of one another;
  the laser beam 13 generated in the laser oscillator 9 is amplified without being affected by optical components;
  the number of laser pulses emitted per pump pulse can be adjusted independently of the amplifier power;

the resonator of the laser oscillator 9 can be extended so that a high beam quality becomes achievable due to a separate arrangement of the output coupling mirror 18; and passive or active Q-switching is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCES 1 first diode laser (for first pump radiation)
2 second diode laser (for second pump radiation, preferably high-power diode laser)
2a diode laser beam sources (for second pump radiation)
3 first optical fiber
4 second optical fiber
4a fiber bundle (consisting of a plurality of second optical fibers)
5 optical fiber line (combined first and second fiber(s))
6 second pump radiation
7 collimator lens for second pump radiation
8 mount for small focusing lens
8a first (smaller) focusing lens for first pump radiation (from first diode laser)
9 laser oscillator
9a Q-switch (Q-switch crystal)
10 laser crystal
11 mount comprising bars for laser crystal
12 second (larger) focusing lens for second pump radiation
12a collimator lens
13 laser beam
14 amplifier crystal
15 amplified laser beam
16 electro-optical Q-switch
17 polarizer
17a analyzer
18 output coupling mirror
19 laser amplifier arrangement
20 path
21 pump source
22 optical deviation device
23 laser amplifier
24 laser oscillator/amplifier configuration
25 longitudinal axis
26 pump radiation guide device
27 first aperture
28 second aperture
29 collimator/focusing optics

The invention claimed is:

1. A laser amplifier arrangement comprising:
an optical pump source for emitting pump radiation; and
an axially arranged laser oscillator/amplifier configuration, which is configured to be pumped by the pump radiation,
wherein the laser oscillator/amplifier configuration is a laser oscillator which configured to be excited by a part of the pump radiation to emit a laser beam, and comprises a laser amplifier configured to receive both the laser beam and pump radiation so as to amplify the laser beam using the pump radiation,
wherein the pump source is configured to introduce the pump radiation into the laser/amplifier configuration at a first longitudinal end of the laser/amplifier configuration, which lies opposite a second longitudinal end of the laser/amplifier configuration at which amplified laser radiation emerges,
wherein the laser oscillator and the laser amplifier are arranged coaxially or collinearly with respect to a longitudinal axis of the laser oscillator/amplifier configuration, and
wherein the pump source comprises a first beam source configured to generate first pump radiation for pumping the laser oscillator, a second beam source configured to generate second pump radiation for the laser amplifier and a common pump radiation guide device configured to guide both the first and the second pump radiation, by which both the first and the second pump radiation is introduced into the laser oscillator/amplifier configuration at the first longitudinal end for longitudinal pumping in a same direction of the longitudinal axis.

2. The laser amplifier arrangement as claimed in claim 1, wherein the first beam source and the second beam source are configured to operate independently of one another, so that the laser oscillator is optically pumped by the first pump radiation and the laser amplifier is optically pumped by the second pump radiation, independently of one another.

3. The laser amplifier arrangement as claimed in claim 1, wherein the first beam source is a first diode laser or the second beam source is a second diode laser or is formed by a plurality of second diode lasers.

4. The laser amplifier arrangement as claimed in claim 1, wherein the first or second beam source is fiber-coupled to the laser oscillator/amplifier configuration.

5. The laser amplifier arrangement as claimed in claim 4, wherein the pump radiation guide device comprises a first optical fiber configured to guide the first pump radiation and a second optical fiber configured to guide the second pump radiation.

6. The laser amplifier arrangement as claimed in claim 5, wherein the pump radiation guide device comprises an optical fiber line in which the at least one first optical fiber and the at least one second optical fiber are combined for parallel guiding of the pump radiations.

7. The laser amplifier arrangement as claimed in claim 6, wherein in the optical fiber line, the first optical fiber and the second optical fiber extend coaxially or parallel to one another.

8. The laser amplifier arrangement as claimed in claim 5, wherein the pump radiation guide device comprises a fiber bundle consisting of a plurality of second optical fibers configured to guide the second pump radiation.

9. The laser amplifier arrangement as claimed in claim 5, wherein in the optical fiber line, the first optical fiber extends centrally inside the second optical fiber or centrally inside a fiber bundle consisting of a plurality of second optical fibers.

10. The laser amplifier arrangement as claimed in claim 1, wherein the second beam source is of substantially higher power than the first beam source.

11. The laser amplifier arrangement as claimed in 1, wherein an optical deviation device is configured to guide the second pump radiation past the laser oscillator to the laser amplifier.

12. The laser amplifier arrangement as claimed in claim 11, wherein the optical deviation device comprises a collimator/lens device configured to collimate the second pump radiation in such a way that the second pump radiation travels quasi-parallel over a defined path.

13. The laser amplifier arrangement as claimed in claim 12, wherein the deviation device is configured so that the second pump radiation travels around the laser oscillator.

14. The laser amplifier arrangement as claimed in claim 12, wherein the laser oscillator is arranged inside or on the defined path and has a cross-section that is substantially smaller than a cross-section of the second pump radiation guided over the path by the deviation device.

15. The laser amplifier arrangement as claimed in claim 12, wherein the collimator/lens device comprises a collimator lens or an entry face, configured as a collimator lens, of a lens unit.

16. The laser amplifier arrangement as claimed in claim 12, wherein the deviation device comprises a first aperture configured for passage of the first pump radiation, unaffected by the deviation device, to the laser oscillator.

17. The laser amplifier arrangement as claimed in claim 16, wherein the first aperture extends centrally or coaxially with the longitudinal axis through the collimator/lens arrangement.

18. The laser amplifier arrangement as claimed in claim 16, wherein the first or second beam source is fiber-coupled to the laser oscillator/amplifier configuration, the pump radiation guide device comprises a first optical fiber configured to guide the first pump radiation and a second optical fiber configured to guide the second pump radiation, and the first optical fiber is fed through the first aperture to the laser oscillator.

19. The laser amplifier arrangement as claimed in claim 1, wherein the laser oscillator comprises a laser crystal.

20. The laser amplifier arrangement as claimed in claim 19, wherein the laser crystal is combined with a passive or active Q-switch.

21. The laser amplifier arrangement as claimed in claim 1, wherein the laser oscillator or a laser crystal thereof is arranged on a holder through which the second pump radiation can travel past the laser oscillator or laser crystal.

22. The laser amplifier arrangement as claimed in claim 1, wherein a first focusing lens is configured before an input coupling face of the laser oscillator, in order to focus the first pump radiation into the laser oscillator.

23. The laser amplifier arrangement as claimed in claim 22, wherein the distance of the first focusing lens from the input coupling face is adjustable or variable.

24. The laser amplifier arrangement as claimed in claim 1, wherein a focusing lens device is configured to focus the second pump radiation guided past the laser oscillator or around the laser oscillator onto the laser amplifier.

25. The laser amplifier arrangement as claimed in claim 24, wherein the focusing lens device arranged between the laser oscillator and the laser amplifier has a second aperture for passage of the laser beam, unaffected by the focusing lens device, from the laser oscillator to the laser amplifier.

26. The laser amplifier arrangement as claimed in claim 24, wherein the focusing lens device has a focusing lens or an exit face, acting as a focusing lens, of a lens unit.

27. The laser amplifier arrangement as claimed in claim 1, wherein the laser amplifier arrangement is part of
    a robot-mounted laser,
    a miniaturized transmitter for LIDAR systems,
    a laser transmitter for use in space, or
    a pump laser for optically nonlinear processes.

\* \* \* \* \*